United States Patent [19]

Cody et al.

[11] 3,955,692

[45] May 11, 1976

[54] HANDLING APPARATUS

[75] Inventors: John P. Cody; James J. Kane, both of Albuquerque, N. Mex.

[73] Assignee: The United States of America as represented by the United States Energy Research and Development Administration, Washington, D.C.

[22] Filed: June 3, 1954

[21] Appl. No.: 440,579

[52] U.S. Cl. ................................. 214/18 N; 176/30
[51] Int. Cl.² ................. B66C 17/08; G21C 19/20
[58] Field of Search ................... 214/26, 21, 22, 23, 214/24, 25, 309, 310, 318, 510, 314, 29, 312, 18 N; 198/226, 218, 221; 89/45, 46, 47; 42/17; 176/30

[56] References Cited
UNITED STATES PATENTS

| | | | |
|---|---|---|---|
| 508,145 | 11/1893 | Mock | 214/314 |
| 1,010,767 | 12/1911 | Hulett | 198/52 |
| 1,131,489 | 3/1915 | Dowd et al. | 214/510 |
| 1,278,307 | 9/1918 | Cressler | 214/24 |
| 1,975,855 | 10/1934 | McBee | 214/24 |
| 2,369,244 | 2/1945 | Lowe | 42/17 |
| 2,409,302 | 10/1946 | Millikin | 214/510 |
| 2,655,079 | 10/1953 | Aldrin et al. | 89/45 |
| 2,679,325 | 5/1954 | Smith | 214/18 |

*Primary Examiner*—Samuel W. Engle
*Assistant Examiner*—S. A. Cangialosi
*Attorney, Agent, or Firm*—Dean E. Carlson; Dudley W. King

EXEMPLARY CLAIM

1. A device of the character described comprising the combination of a guide tube having a normally open end, a support frame having a port therethrough, linkage means pivotally connected with the tube and with the frame and rotatably supporting the tube for movement between a position in longitudinal alignment with said port and with its open end in registry with the port and an additional position in which the tube lies adjacent the port with a side portion of the tube extending generally transversely across said port, an elongated track carried by said frame disposed generally parallel to and adjacent the tube in its said additional position, means connected with and projecting laterally from said tube adjacent its open end engaging and movable along said elongated track for cooperating with the track to direct the tube during movement between said positions, and means carried by the tube for moving an article therethrough toward and away from said port.

9 Claims, 17 Drawing Figures

INVENTORS
JOHN P. CODY
JAMES J. KANE
BY
Roland A. Anderson

INVENTORS
JOHN P. CODY
JAMES J. KANE
BY
Roland A. Anderson

HANDLING APPARATUS

The present invention relates to apparatus for inserting an article or slug into or withdrawing it from an opening or chamber, and particularly to such apparatus which normally projects only a limited distance into a room.

An object of the present invention is to provide new and improved apparatus for inserting an article into or withdrawing it from an opening or chamber.

Another object is to provide new and improved apparatus for transferring an article from one position to another.

Another object of the present invention is to provide new and improved apparatus for inserting an article into or withdrawing it from an opening or chamber and which projects only a limited distance into a room when not in use inserting or withdrawing an article.

Another object is to provide article transferring apparatus which embodies means for retaining an article in an opening or chamber subsequent to insertion therein.

A still further object of the invention is to provide new and improved article transferring apparatus which embodies means facilitating manual control of the apparatus.

Other and further objects of the invention will be obvious upon an understanding of the illustrative embodiment about to be descirbed, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
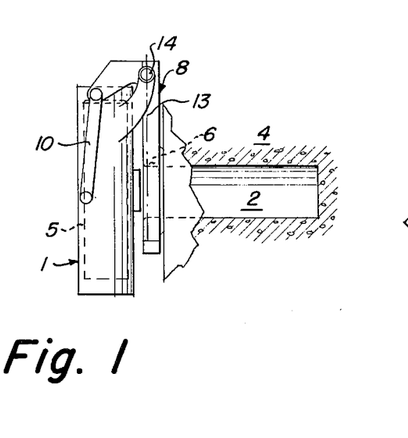
FIGS. 1 through 4 are simplified representations showing in a general way construction and operation of the present apparatus.
Figure 2:
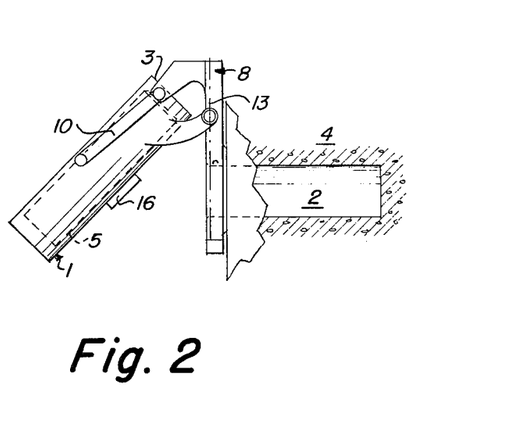
Figure 3:
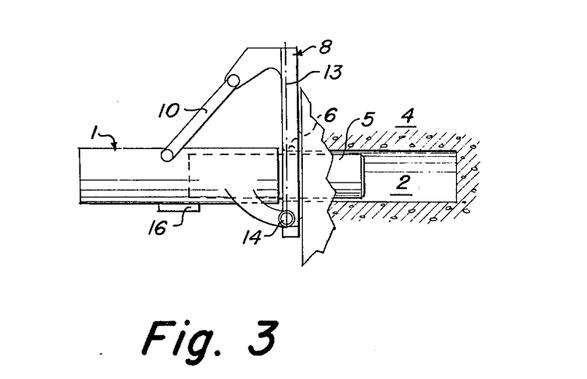

Described generally, the present apparatus comprises (FIGS. 1 through 4) a guide tube 1 adapted to be moved into and out of registry with an opening or chamber 2 of a wall 4, so that an article or slug 5 may be transferred from the guide tube to the opening 2 or, conversely, from the chamber into the guide tube. The guide tube 1 is swingably mounted on a supporting frame 8 by link means 10 secured adjacent one end thereof to a portion of the supporting frame 8 and adjacent the other end thereof to the guide tube 1; control or directing of the tube during swinging between the positions of FIGS. 1 and 3 is provided by elongated tracks or screws 13 along which travel cooperating or complementary members 14. The frame 8 may be affixed to any suitable portion of a wall 4.

In FIG. 1 the guide tube and associated mechanism is shown in what may be referred to as a normally collapsed position. FIG. 2 illustrates the guide tube swinging from the FIG. 1 position toward a position in which the end 3 of the guide tube may be in alignment or registry with an open end of the chamber 2 (FIG. 3), so that the article 5 may be transferred from the guide tube to the chamber 2. Subsequent to transfer of an article from the guide tube into the chamber, the guide tube swings back to the collapsed position (FIG. 4) and retaining means 16 carried by the guide tube 1 may maintain pressure against the article 5 and any associated carrying means which may be used, to hold them in the chamber 2 until withdrawal is desired. The construction and operation of the apparatus will now be described in greater detail.

As shown in FIGS. 5 through 9, the supporting frame 8 includes a pair of legs 20, each adapted to be secured adjacent one end thereof to the wall 4 and adjacent their other ends to the upper part 21 of supporting frame member 8, which is adapted to support a driving motor, clutches, gearing and associated mechanism for swinging the guide tube 1 between the upright and horizontal positions shown in FIGS. 1–4. A depending portion 23 of the supporting frame supports elongated screw members 13 that are operatively connected through gearing with the actuating motor 24 so that they may be simultaneously rotated thereby. The screw members 13 may be mounted, for example, adjacent their upper ends in ball bearings 66, contained by and retained within bearing brackets 67 and adjacent their lower ends by projecting into openings of suitable bracket portions carried by the depending frame portion 23. Frame extensions 26 facilitate connection with the links 10 that support the guide tube. These links 10 are rotatably connected adjacent their upper and lower ends with the frame extensions 26 and the guide tube 1 by pins and bearings 29 so that the guide tube may be readily moved between its upright and horizonal positions.

Insertion of articles into and their removal from the guide tube 1 is facilitated by the tube door 38, shown hinged adjacent a cut-away portion of the tube and normally retained in position by springs 40 and latch 41. The door may be readily opened to facilitate insertion or removal of articles or specimens.

Figure 4:
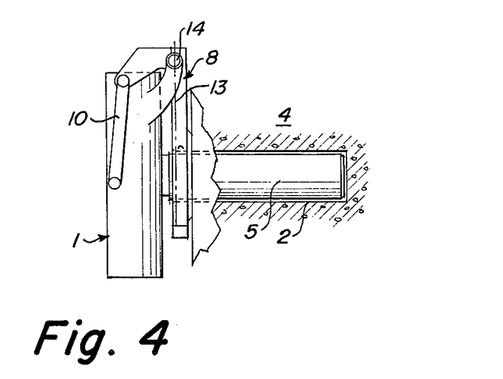

Swinging of the guide tube back and forth between the illustrated collapsed or upright position of FIGS. 1 and 4 and the aligned or "horizontal" position of FIGS. 3 and 5 through 9 may be achieved by connecting it, through extensions 31, with pins 32 of threaded members or screw nuts 33 which encircle the screw members 13. When the screw members 13 rotate about their longitudinal axes in one direction, the complementary screw nuts 33 and pins 32 carried thereby cooperate with the guide tube extensions 31 to move them toward lower ends of the screws and to thus swing the tube 1, about its support at the lower ends of link members 10, toward the registering or horizontal position. When the screw members 13 rotate in an opposite direction, the reverse action takes place and the guide tube 1 swings toward its vertical or collapsed relationship as the screw nuts 33 and pins 31 travel along the screw members 13. The supporting links 10 move simultaneously with the guide tube and continue to support it.

Swinging movement of the guide tube, for example, to a position for presenting an article to the opening or chamber 2 of the wall 4, may be obtained by an actuating motor 24 which rotates the vertical screw members 13 through the intermediation of toothed motor shaft 47, gear 48 having output shaft 50 secured thereto, internally splined portion 51 of spring housing 52, shock absorbing spiral spring 53 contained within housing 52 and secured adjacent its outer end to the housing 52 by pin 62, driving member 54 that is secured to an inner end portion of the spring 53 and has projections 54a adapted to mesh with and rotate a clutching and de-clutching member 55 which is pinned or otherwise secured to vertically movable shaft 57 and engageable in turn with projections 56a of drive gear 56, idler gears 58 carried by brackets 59, and drive gears 60 keyed to the elongated screw members 13. The spiral spring 53 absorbs starting shock in either direction of rotation of the reversible drive motor 24 and the drive gear 56 applies the driving force relatively smoothly to the elongated screw members 13.

Figure 5:
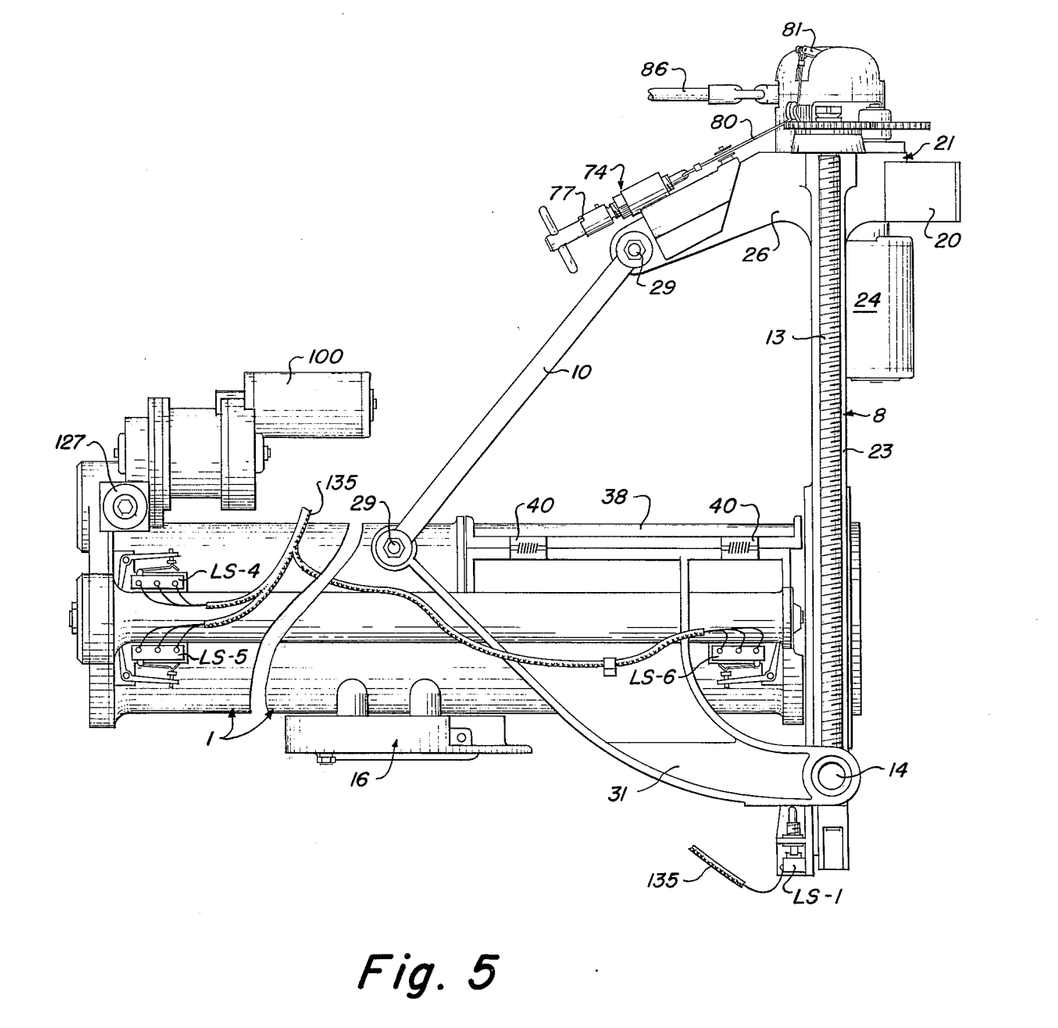
FIG. 5 is a side elevational view showing the apparatus positioned for insertion or ejection of an article.
Figure 6:
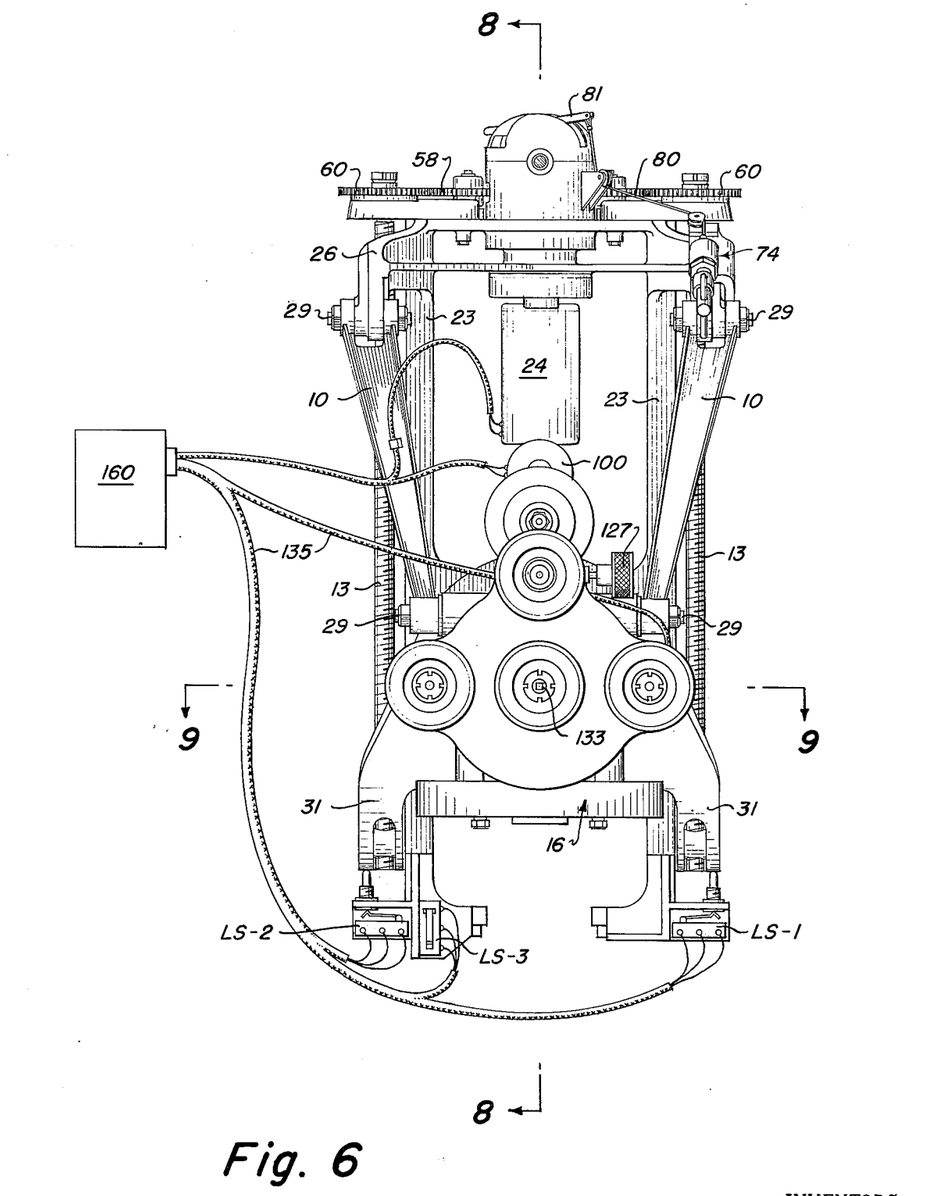
FIG. 6 is an end view of the apparatus shown in FIG. 5.
Figure 7:
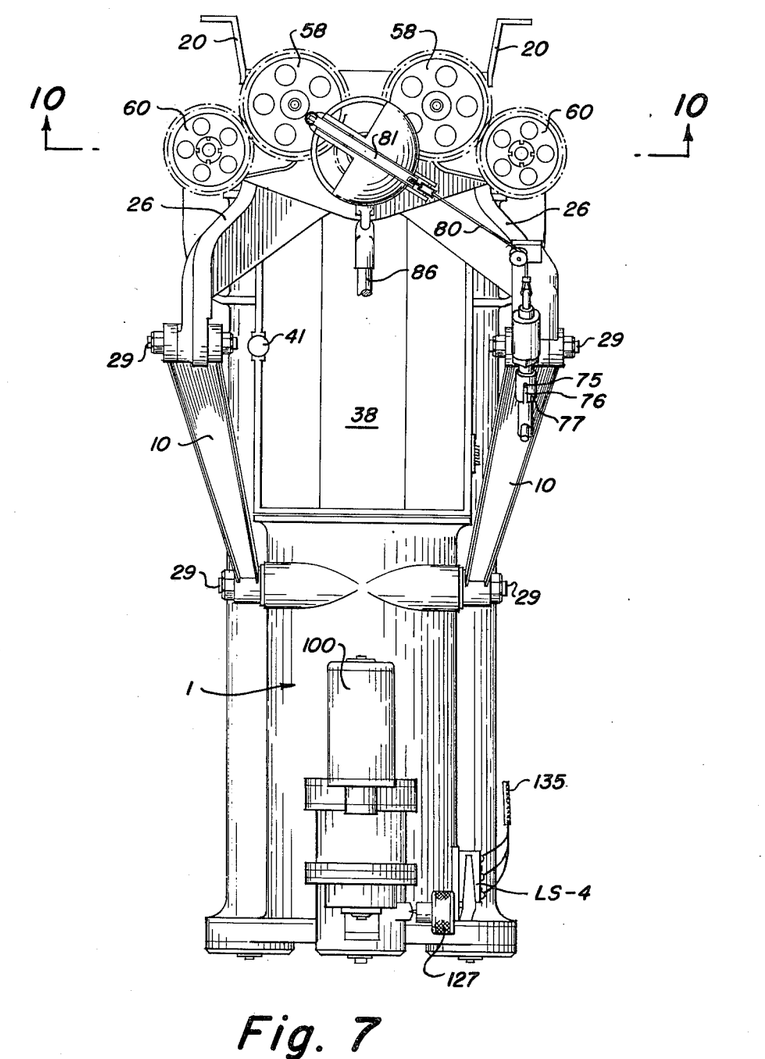
FIG. 7 is a top view of the apparatus shown in FIGS. 5 and 6.
Figure 10:
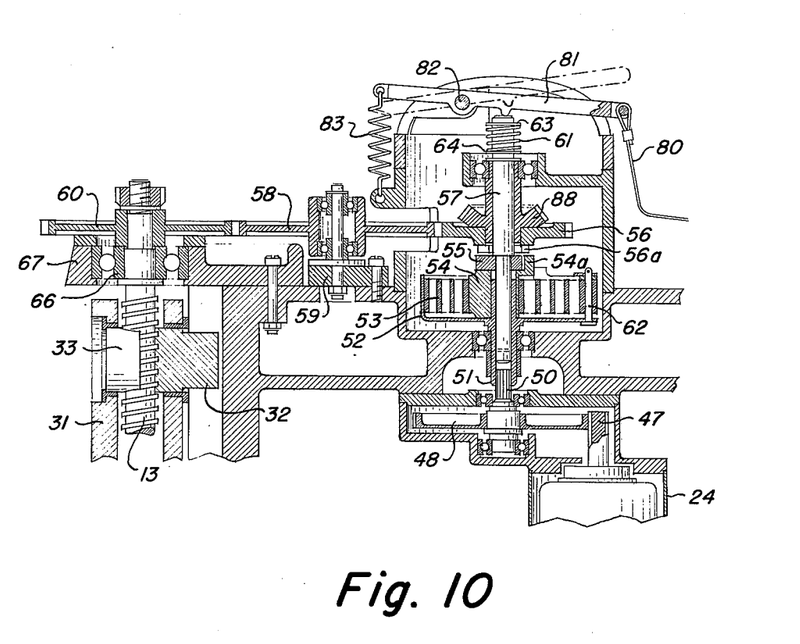
FIG. 10 is a fragmentary sectional view taken along line 10—10 of FIG. 7 showing features of the drive mechanism for rotating the guide tube.

The shaft 57 and its clutching and declutching member 55 are normally maintained in the elevated relationship indicated by dot-dash lines in FIG. 10 by spring 61 that bears at its upper end against a ring or collar 63 secured to the shaft 57 and at its lower end against a collar 64, in which position the member 55 is maintained in engagement with both the driving gear 56 and projections 54a of the shock absorbing assembly 52-53. If it is desired to manually operate the elongated screw members 13 the shaft 57 and its interengaging member 55 may be moved downwardly in opposition to the spring 61 so as to move the member 55 out of the recesses in the drive gear 56 and thus disengage it from the driving motor 24. This disengagement in preparation for manual drive is obtained by clutch control handle assembly 74 (FIG. 5). When pull is exerted on this handle assembly 74, the pin 75 is moved out of its slot 76 and may be rotated out of alignment with it so as to rest in a retaining groove 77; this exerts a force on the cable assembly 80 to swing the shift bar 81 about its pivot pin 82 in opposition to spring 83. When the clutch control handle assembly is thus operated to disengage the driving motor 24, the drive gear 56 may be rotated manually by a suitable wrench (not shown) inserted into the noncircular socket 85 of the extension shaft assembly 86; rotation of the latter correspondingly rotates the bevel gear 87 and also the meshing bevel gear 88 that is secured to the drive gear 56 and normally rotates with it.

Movement of an article lengthwise of the guide tube 1 to eject it therefrom or to withdraw it thereinto is shown obtained by a pair of rotatable screws 92 carried by and extending lengthwise of the guide tube. These screws 92 are housed in channels 96, and may project into brackets 93 at one end thereof and adjacent their other ends into and be secured to gears 94, which are in turn supported by ball bearings 95. A crossbar 98 having internally threaded portions adjacent its ends engages the screw members 92 so that upon rotation of the latter, the crossbar is caused to move to and fro along the guide tube 1, depending upon the direction of rotation of the screw members 92. The crossbar 98 may be provided with appropriate lugs or other configurations 99 for cooperating either directly with an article or with the article through an article-attaching means during movement of the article along the guide tube.

Simultaneous rotation of the screw members 92 and gears 94 that are keyed to them may be provided by a reversible drive motor 100, through the intermediation of motor shaft 101, meshing reduction gear 102 keyed to shaft 103 which is attached to spring housing 104, shock absorbing springs 105 which have affixed adjacent their outer ends lugs 107 that project into slots 112 of the housing 104 and are affixed at their inner ends 106 to spring arbor 108 by projecting into a slot 109 thereof, spur gear 114 keyed to the spring arbor 108, shifting gear 115 which is provided with projecting lugs 116 at one side thereof for engagement with complementary lugs on the drive gear 117 carried by the same shaft 118 that projects through the meshing gear 115, and drive gear 120 that meshes with the spur gears 94 carried by the screw members 92.

The spiral springs 105 which encircle the spring arbor 108 absorb shocks incident to starting the motor 100 so that the starting torque is applied relatively evenly to the gear 114 carried by the spring arbor and through the various gears to the elongated screws 92. One of the spiral springs tends to absorb shock in one direction of rotation of motor 100 and the other spring absorbs it when the motor is reversed for rotation in an opposite direction to correspondingly rotate the elongated screws and move the crossbar 98 and an article in an opposite direction.

Figure 11:
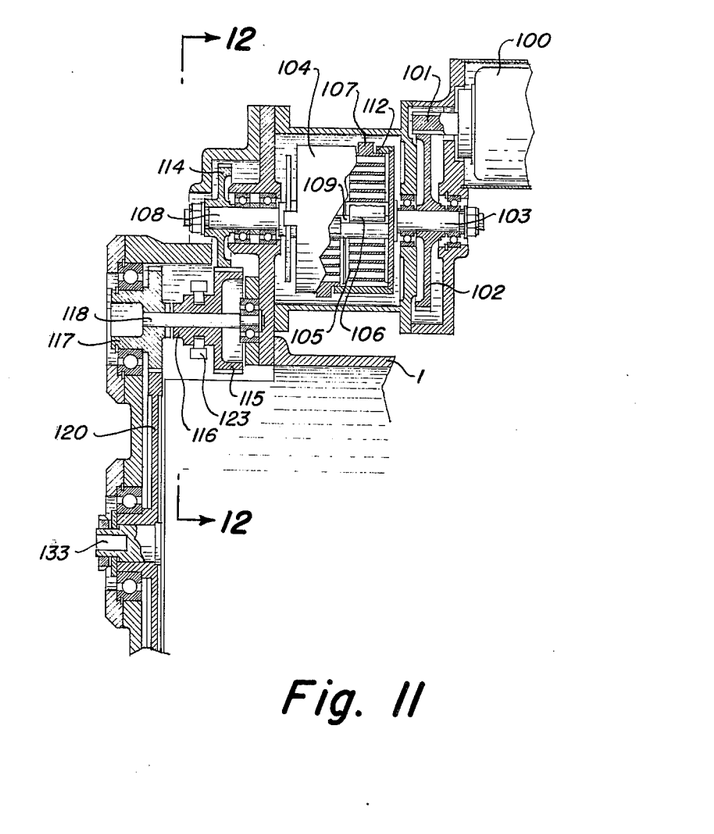
FIG. 11 is a sectional view showing on a larger scale a portion of the driving mechanism, illustrated at the left of FIG. 8, for operatively interconnecting an actuating motor with article moving means of the guide tube.
Figure 12:
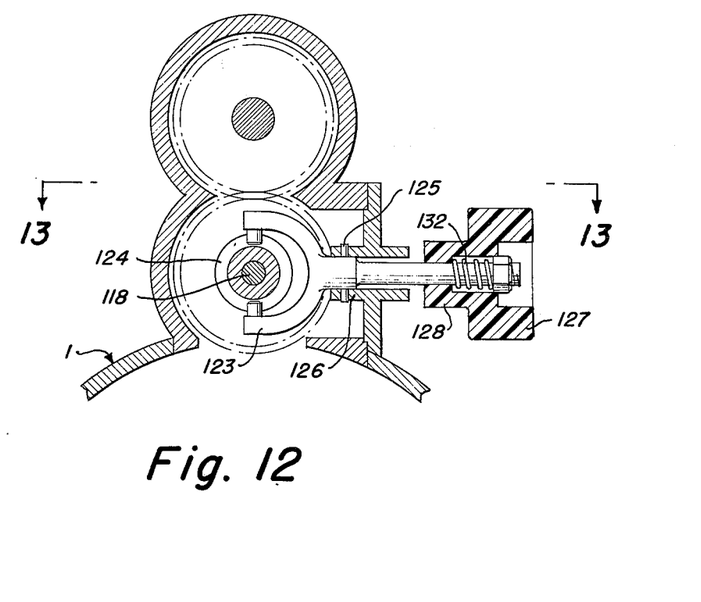
FIG. 12 is a sectional view taken along line 12—12 of FIG. 11 showing means for connecting and disconnecting an electric motor to provide for manual or motor actuation of article moving means along the guide tube.
Figure 13:
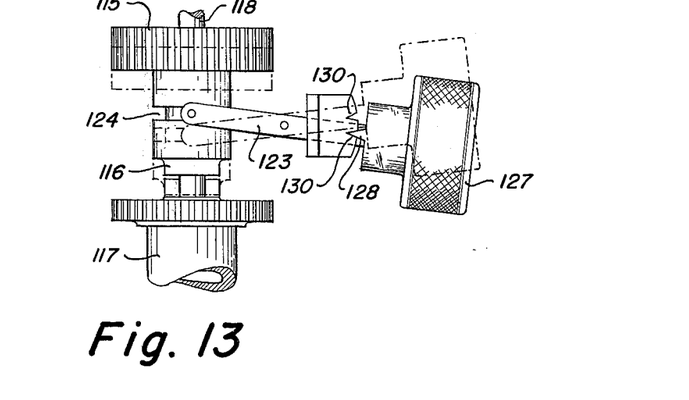
FIG. 13 is a fragmentary sectional view taken along line 13—13 of FIG. 12.

It may be desirable occasionally to disconnect the elongated screws 92 from the driving motor 100 to facilitate rotating the screws by hand so as to move the crossbar 98 and an article lengthwise of the guide tube 1. This is shown provided by moving the gear 115 along its supporting shaft 118 so as to move its projections 116 out of engagement with the complementary projections on the drive gear 117. Movement of this gear along its shaft is achieved (FIGS. 11–13) by yoke members 123 which has pins or rollers projecting into an annular groove 124 of the shifting gear 115 and which is rotatably supported by a pin 125 projecting through a boss 126 of an adjacent casing. The outer end or extension of the yoke 123 may be provided with a knob 127 which has a projection 128 adapted to selectively engage one or the other of retaining notches 130. A spring 132 extending about a portion of the yoke member 123 normally urges the knob 127 into locking engagement with the particular notch into which the projection 128 is inserted, thereby minimizing the possibility of accidental shifting of the yoke and shifting spur gear. When the yoke member 123 is positioned for manual operation, the projection 116 of the shifting spur gear 115 are out of engagement with the projection of the gear 117 and rotation of the elongated screws 92, keyed spur gears 95 and cooperating gear 120 may be obtained by inserting a crank (not shown) into a noncircular recess 133 at the center or hub of the gear 120.

Power for operating the actuating motors 24 and 100 may be supplied from any suitable source or sources through the conductors or cables 135.

As previously mentioned, the lugs 99 of the guide tube crossbar 98 may engage, either directly or through an attaching means, a slug or other article that is to be inserted into or removed from the chamber 2. After insertion of an article into a chamber 2, in which relationship the crossbar and its lugs are located adjacent an open end of the chamber 2, the guide tube 1 swings upwardly and withdraws the lugs 99 from a suitable complementary portion of the attaching means 97 or article, so that the article remains in the chamber. Upward swinging of the guide tube toward collapsed or vertical position is obtained by reversing the rotation of drive motor 24 or suitably rotating the manual operating mechanism. When the motor or manual drive is subsequently actuated to swing the guide tube downwardly toward horizontal position, the lugs 99 again fit over projections of an attaching means and upon suitable rotation of the guide tube motor 100, the screws 92 rotate to move the crossbar therealong and retract the article from the chamber 2.

Figure 14:
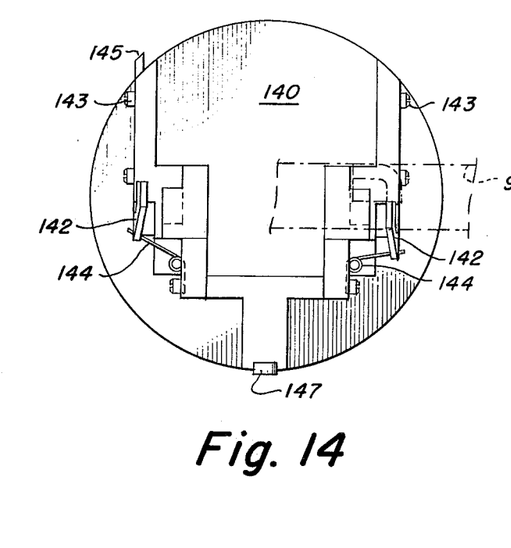
FIG. 14 is an end view of means that may be attached to a movable object or slug in the guide tube to facilitate movement and positioning thereof.
Figure 15:
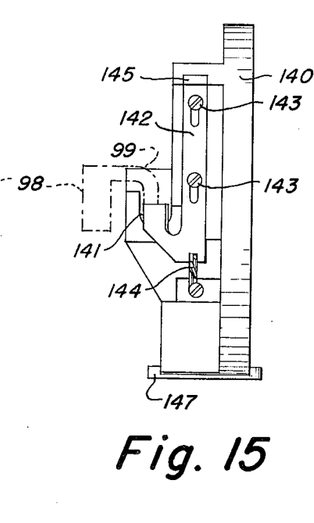
FIGS. 15, 16 and 17 are, respectively, right side, left side, and top views of the means shown in FIG. 14.
Figure 16:
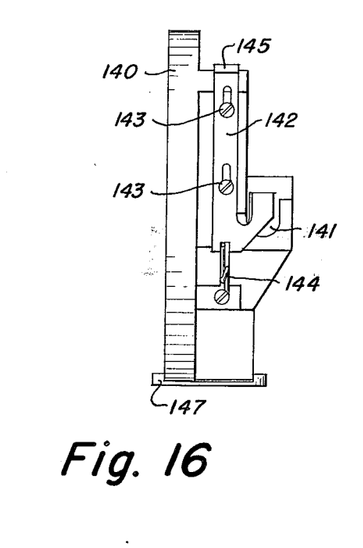
Figure 17:
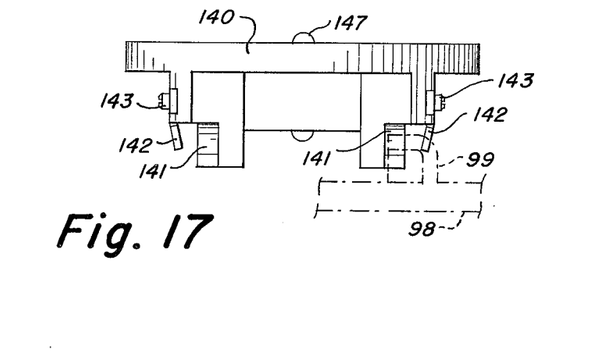

In some instances, for example, where the chamber 2 has no air outlet, there may be a tendency to trap and compress air within the chamber upon insertion of an article; in this event auxiliary means may be provided to retain an article in the chamber in opposition to air pressure. Means for achieving this may comprise (FIGS. 8, 9, 14–17) a plate 140 that peripherally conforms to the tube bore and which may be bolted or otherwise secured to an article, the plate being slidable along the guide tube 1 in response to movement of the crossbar 98 which engages it by lugs 99. The lugs 99 are indicated in FIGS. 14, 15 and 17 by dot-dash lines in the relationship which they occupy with respect to the plate member 140, with the lugs projecting into recesses 141 of the plate member and abutting against shoulders of "vertically" movable latch member 142 to hold them in a retracted position on their supporting pins or bolts 143. The latch members are normally urged outwardly (upwardly in FIGS. 14–17) by springs 144 so that terminal portions 145 of them may project into apertures 6 in the wall of the chamber 2. Movement of the crossbar toward the chamber 2 moves the plate member 140 assemblage into the chamber 2 and aligns the latch members 142 with the apertures 6 so that as the guide tube 1 swings upwardly, its lugs 99 move away from the latch member shoulders and the springs 144 move the terminal portions 145 into the apertures 6, thereby locking the plate member 140 and any article secured to it in the chamber 2 where they will remain in opposition to any tendency of air pressure to eject the article. When the guide tube 1 again swings downwardly for removal of an article, the lugs 99 again move the latch members down in opposition to the springs 144 and unlock the plate member for article withdrawal.

Circumferential movement of the plate member 140 may be prevented, to thereby keep the terminal portions in alignment with the recesses 6, by key 147 secured to the plate member 140 which normally travels along a keyway or slot 148 in the guide tube 1 and a similar aligned slot 148a in a wall of the chamber 2.

Figure 8:
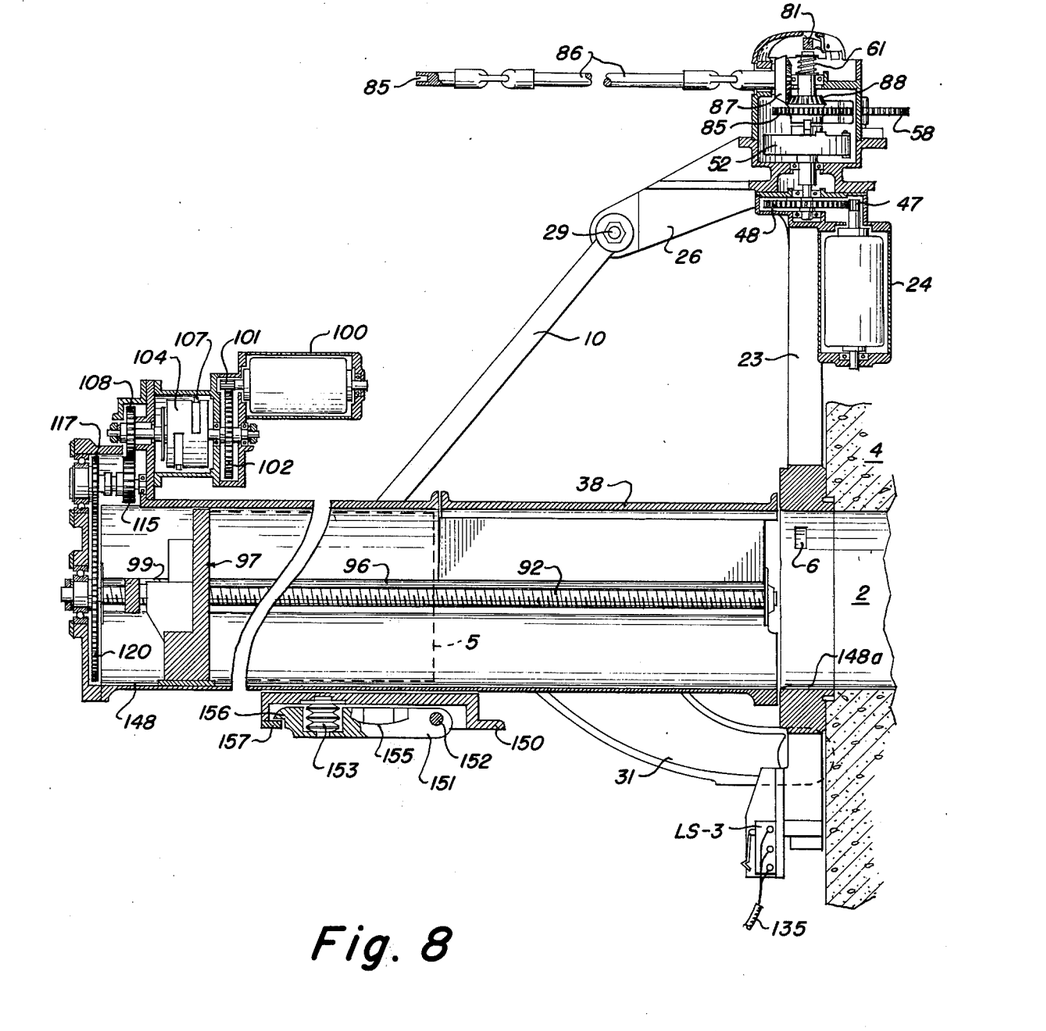
FIG. 8 is a vertical sectional view taken along line 8—8 of FIG. 6 showing features of the drive mechanism and a tube for containing and guiding an article.
Figure 9:
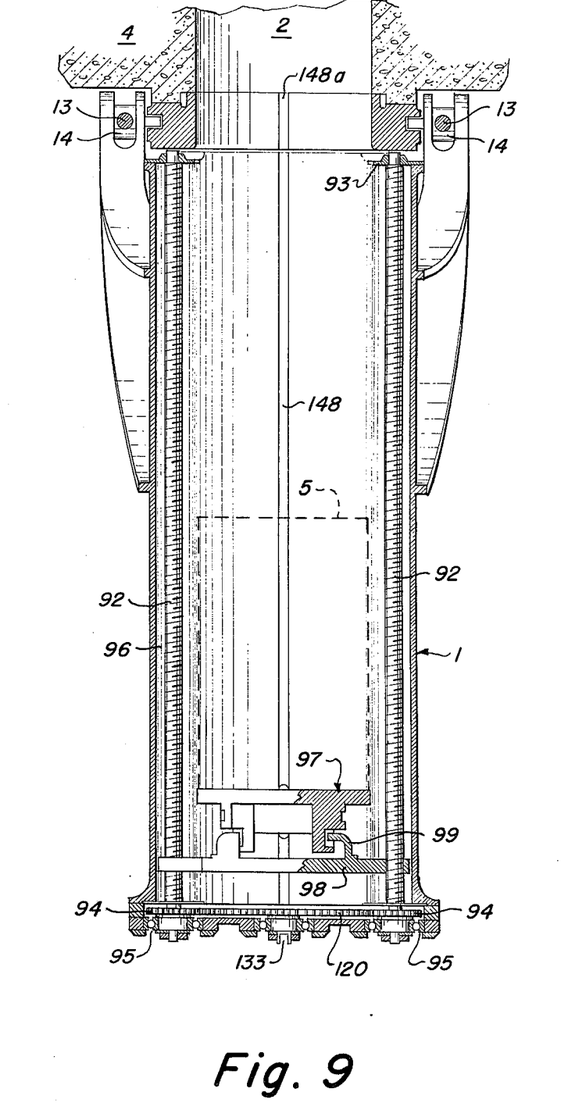
FIG. 9 is a horizontal sectional view taken along line 9—9 of FIG. 6 showing additional features of the guide tube.

Retaining means 16 may be carried by the guide tube to apply pressure against an article or its holding means and assist in retaining it in the chamber 2. As shown in FIGS. 5 and 8, this means may comprise a casing 150 containing a lever member 151 rotatably supported adjacent one end thereof by a pin 152 and resting against a bellville or other compression spring 153 at a location spaced from the supporting pin 152. When a portion of the lever member, e.g., its seat 155, presses against an article or its holder, the spring means 153 is at least partially compressed and yieldably presses against the article or its holder. Movement of the lever 151 may be limited by a toe portion 156 which projects beyond a fixed portion or cover 157 of the casing 150.

While the electric drive motors 24 and 100 may be operated at appropriate instants and for suitable time periods by manually opening or closing switches, operation is preferably automatically controlled. This may be obtained, for example, by connecting the drive motors, through conductors 135, with a control unit 160 and suitable adjustably supported limit switches LS-1 through LS-6, these limit switches appropriately interrupting or initiating current supply to the drive motors and also effecting operation of a rotatable stepping switch that comprises part of the control unit 160. In addition to stopping drive motors when the guide tube has reached positions adjacent upper or lower limits of its travel and when the guide tube crossbar has reached positions adjacent outer or inner ends of the guide tube, the limit switches and control unit provide for reversing the motors at proper times. Of course, when the drive motors 24 and 100 are operatively disengaged, the device may be manually operated as previously described.

While terms such as upright, vertical, upwardly, downwardly, and horizontal have been used herein, it is to be understood that this has been done purely for clarity and convenience of description as the present invention may be mounted in any desired suitable position. Also, various bolts, screws, nuts, et cetera have been omitted from the drawings to facilitate clarity of illustration and description; it will be understood that the apparatus may be built up in any appropriate manner.

It will be seen that the present invention provides a new and improved device or apparatus which may be employed for inserting a slug or other article into and removing it from a wall chamber and which projects a minimum distance into a passageway or room when in collapsed position. The device may be actuated by electric motors controllable from a remote location or operated manually by extension rods.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. A device of the character described comprising the combination of a guide tube having a normally open end, a support frame having a port therethrough, linkage means pivotally connected with the tube and with the frame and rotatably supporting the tube for movement between a position in longitudinal alignment with said port and with its open end in registry with the port and an additional position in which the tube lies adjacent the port with a side portion of the tube extending generally transversely across said port, an elongated track carried by said frame disposed generally parallel to and adjacent the tube in its said additional position, means connected with and projecting laterally from said tube adjacent its open end engaging and movable along said elongated track for cooperating with the track to direct the tube during movement between said positions, and means carried by the tube for moving an article therethrough toward and away from said port.

2. A device as claimed in claim 1, in which said means carried by the tube comprises a rotatable threaded shaft disposed longitudinally of the tube and housed within a channel in a wall of the tube, and means carried by the tube rotatably supporting said shaft.

3. A device as claimed in claim 1, in which said means carried by the tube comprises a rotatable threaded shaft disposed longitudinally of the tube and housed within a channel in a wall of the tube, means carried by the tube rotatably supporting said shaft and a drive motor and gearing are carried by the tube for rotating said threaded shaft.

4. A device as claimed in claim 1, in which said means carried by the tube comprises a pair of rotatable spaced apart threaded shafts disposed longitudinally of the tube and housed in channels in a wall of the tube, means carried by the tube rotatably supporting said shaft and a crossbar extending between and in threaded engagement with each of said spaced shafts for movement lengthwise of the tube upon rotation of the spaced shafts.

5. A device as claimed in claim 1, in which the track comprises a rotatable threaded shaft, a nut member is carried by the laterally projecting means and engages said threaded shaft, and drive means is carried by the support frame and operatively connected with an upper end of said threaded shaft for rotating the same to thereby move said tube.

6. A device as claimed in claim 1, in which means including a yieldably supported member is carried by the guide tube intermediate its ends and at a side portion thereof registrable with said port to exert pressure against an article and yieldably retain the article in said port when the tube is disposed in said additional position with said side portion extending across the port.

7. A device as claimed in claim 1, in which means is carried by the guide tube intermediate its ends and at a side portion thereof registrable with said port to exert pressure against an article and retain the article in said port when the tube is disposed in said additional position with said side portion extending across the port.

8. A device as claimed in claim 7, in which the guide tube is provided with a movable wall portion at a side thereof opposite said article retaining means and adjacent the normally open end of the guide tube to facilitate insertion and removal of articles when the tube is disposed in said additional position.

9. A device as claimed in claim 1, in which said means carried by the tube comprises a rotatable threaded shaft disposed longitudinally of the tube, bearings are carried by said tube for rotatably supporting the shaft, means is carried by the tube for rotating said shaft, threaded means engages said shaft and is movable longitudinally of the shaft and tube in response to rotation of the shaft, and article-attaching means is provided in the tube and engaging said threaded means having a projectible member for cooperating with a recess in a wall of an adjacent opening to retain the article-attaching means in the opening.

* * * * *